(12) United States Patent
Zhu et al.

(10) Patent No.: US 11,121,417 B2
(45) Date of Patent: Sep. 14, 2021

(54) LEAD-ACID BATTERY STORAGE CONTAINER

(71) Applicant: Zexin Zhu, Chaozhou (CN)

(72) Inventors: Zexin Zhu, Chaozhou (CN); Xixin Zhu, Chaozhou (CN); Yongming Chen, Chaozhou (CN); Songting Zhu, Chaozhou (CN); Xiyong Zhu, Chaozhou (CN); Zhixiang Wan, Chaozhou (CN)

(73) Assignee: Zexin Zhu, Chaozhou (CN)

( * ) Notice: Subject to any disclaimer, the term of this patent is extended or adjusted under 35 U.S.C. 154(b) by 281 days.

(21) Appl. No.: 16/319,345

(22) PCT Filed: Oct. 26, 2016

(86) PCT No.: PCT/CN2016/103330
§ 371 (c)(1),
(2) Date: Jan. 20, 2019

(87) PCT Pub. No.: WO2018/040263
PCT Pub. Date: Mar. 8, 2018

(65) Prior Publication Data
US 2019/0280351 A1 Sep. 12, 2019

(30) Foreign Application Priority Data
Aug. 31, 2016 (CN) .......................... 201610775598.0

(51) Int. Cl.
*H01M 10/54* (2006.01)
*B09B 3/00* (2006.01)
*B30B 9/20* (2006.01)

(52) U.S. Cl.
CPC ............... *H01M 10/54* (2013.01); *B09B 3/00* (2013.01); *B30B 9/20* (2013.01); *Y02W 30/84* (2015.05)

(58) Field of Classification Search
CPC ......... B02C 23/08; B02C 23/10; B02C 23/38; B30B 3/00; B30B 3/005; B30B 3/02;
(Continued)

(56) References Cited

U.S. PATENT DOCUMENTS 4,273,746 A * 6/1981 Kolakowski ........... C01G 21/14
423/434
4,637,928 A * 1/1987 Zajac, Jr. ................ H01M 6/52
241/27
(Continued)

FOREIGN PATENT DOCUMENTS

CN 101217192 A 7/2008
CN 101246979 A 8/2008
(Continued)

OTHER PUBLICATIONS

International Search Report of PCT/CN2016/103330.
(Continued)

*Primary Examiner* — Shelley M Self
*Assistant Examiner* — Jared O Brown
(74) *Attorney, Agent, or Firm* — Dragon Sun Law Firm, PC; Jinggao Li, Esq.

(57) ABSTRACT

The disclosure provides a lead-acid battery storage container, mainly including an upper compartment body and a lower compartment body; the upper compartment body is provided with a pressure roller driven by a driving mechanism located at both sides of the upper compartment body; a slide rail is provided at one end of the upper compartment body, and an air duct is provided at the other end; a grab bucket is provided at the top of the upper compartment body, and a collecting tank is provided at both sides of the bottom thereof; and a water pool is located at the bottom of the lower compartment body. In the present disclosure, the driving mechanism is a translational trolley, and a bearing (Continued)

block engaged with an end of the pressure roller is provided at an upper side of the translational trolley.

9 Claims, 2 Drawing Sheets

(58) Field of Classification Search
CPC .. B30B 3/04; B30B 3/045; B30B 3/06; B30B 9/20; H01M 10/54; H01M 6/52
USPC ............................................................ 241/3
See application file for complete search history.

(56) References Cited

U.S. PATENT DOCUMENTS

| | | | | |
|---|---|---|---|---|
| 5,211,818 A | * | 5/1993 | Moure, Jr. ............ | H01M 10/54 |
| | | | | 205/599 |
| 2005/0111939 A1 | * | 5/2005 | Kuipers ................ | B66C 23/201 |
| | | | | 414/280 |

FOREIGN PATENT DOCUMENTS

| | | | | |
|---|---|---|---|---|
| CN | 201153147 Y | * | 11/2008 | ............ H01M 10/54 |
| CN | 201153147 Y | | 11/2008 | |
| CN | 104984977 A | | 10/2015 | |
| WO | 2008111709 A1 | | 9/2008 | |

OTHER PUBLICATIONS

Written opinion of PCT/CN2016/103330.
RO101 Request form of PCT/CN2016/103330.
First Office Action of Chinese patent application 201610775598.

\* cited by examiner

LEAD-ACID BATTERY STORAGE CONTAINER

CROSS-REFERENCE TO RELATED PATENT APPLICATIONS

This application is a national stage application of PCT Application No. PCT/CN2016/103330. This application claims priority from PCT Application No. PCT/CN2016/103330, filed Aug. 31, 2016, and CN Application No. 201610775598, filed Aug. 31, 2016, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The disclosure relates to a processing technology device for waste lead-acid batteries, and in particular relates to a lead-acid battery storage container.

BACKGROUND ART

At present, the lead-acid batteries that have been scrapped have environmental safety hazards, which are mainly reflected in the three stages of recycling, disassembly and smelting. In the process of recycling and collection, waste lead-acid batteries are classified as hazardous wastes. Some illegal purchasers have not obtained hazardous waste business licenses and do not have the qualification for recycling. Acid liquid is dumped at will, which may cause major environmental safety hazards. In the disassembly process, most of the small regenerative lead plants do not have mechanical crushing equipment, with almost all of batteries artificially disassembled. Without any anti-pollution measures, the plants discharge acid liquid arbitrarily, so that the surface is seriously corroded; and other wastes with no recycling value are discarded or landfilled, resulting in serious pollution to the environment.

Therefore, a heretofore unaddressed need exists in the art to address the aforementioned deficiencies and inadequacies.

SUMMARY OF THE DISCLOSURE

The object of the present disclosure is to provide a lead-acid battery storage container directed at the current state of the art, so as to realize effective recovery of the acid liquid in the waste lead-acid battery before and during the crushing process, and to treat the gas in the compartment, so that the environment is protected and no pollution produced.

In order to achieve the above object, the present disclosure adopts the following technical solutions:

The disclosure relates to a lead-acid battery storage container, mainly including an upper compartment body and a lower compartment body; the upper compartment body is provided with a pressure roller driven by a driving mechanism located at both sides of the upper compartment body; a slide rail is provided at one end of the upper compartment body, and an air duct is provided at the other end; a grab bucket is provided at the top of the upper compartment body, and a collecting tank is provided at both sides of the bottom thereof; and a water pool is located at the bottom of the lower compartment body.

In the above solutions, the driving mechanism is a translational trolley, and a bearing block engaged with an end of the pressure roller is provided at an upper side of the translational trolley.

Further, the collecting tank extends outside the upper compartment body to be connected to the waste acid collecting bin.

Further, a meshed cover is provided on the collecting tank.

Preferably, the bottom of the upper compartment body is made of granite.

In the above solutions, the slide rail is inclined downward, and a plurality of wind curtains are provided in the slide rail.

Further, an exhaust fan is provided in the air duct connected to the water tank, with the gas discharged by an exhaust pipe.

Further, the slide rail is connected to the crushing device of which the bottom is provided with an acid liquid pipe connected to the water pool.

Further, an overflow port is provided at the water pool and connected to the waste acid collecting bin via a pipe.

Further, a water supply port is provided at the water pool.

The beneficial effects of the disclosure are described as follows: the lead-acid battery storage container of the disclosure adopts a double-layer structure, and the upper part compacts the batteries, so that the waste acid liquid in the battery flows out for collection; a granite floor is provided in the upper compartment body to reduce possibility of acid etching; at the same time, the pollutant gas is discharged in real time for filtration; the batteries are sent to the crushing device for crushing after being compacted; the remaining acid liquid in the batteries, after the batteries being crushed, are discharged into the lower compartment body for dilution and then into the waste acid collecting bin together with the waste acid from the upper compartment body for subsequent processing. The disclosure recycles the waste acid to form a cycle process with efficiently recovered acid liquid, which belongs to an efficient environmental protection project, so that the waste acid can never leak to the land, and the air and the land are not polluted.

BRIEF DESCRIPTION OF THE DRAWINGS

The accompanying drawings illustrate one or more embodiments of the present disclosure and, together with the written description, serve to explain the principles of the disclosure. Wherever possible, the same reference numbers are used throughout the drawings to refer to the same or like elements of an embodiment.

DETAILED DESCRIPTION OF THE DISCLOSURE

Figure 1:
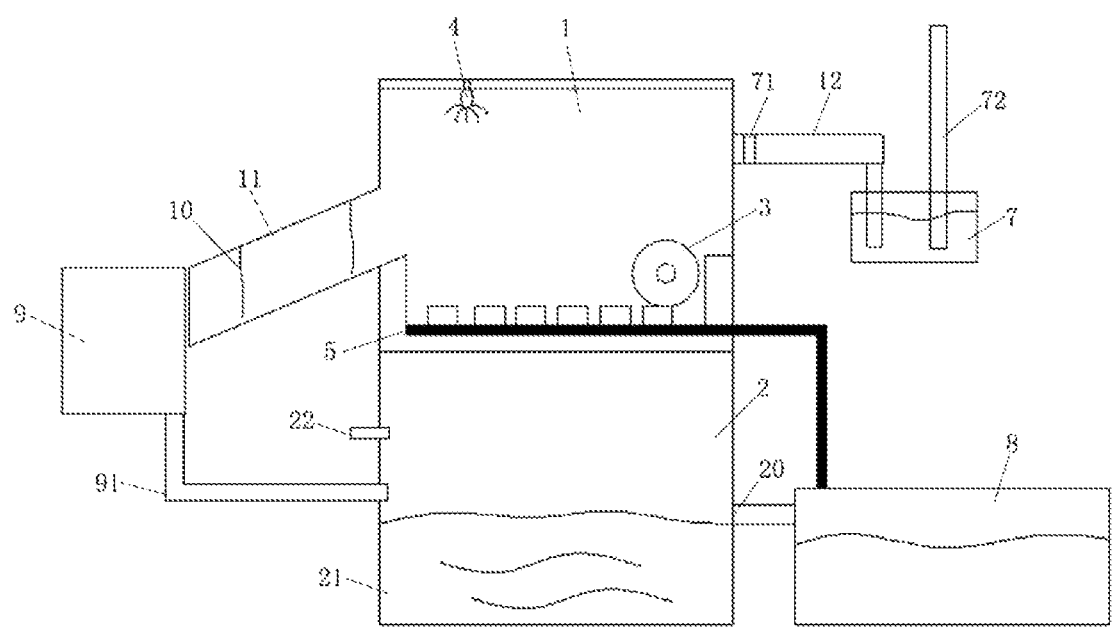
FIG. 1 is a schematic structural view of the present disclosure.

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the disclosure to those skilled in the art. Like reference numerals refer to like elements throughout.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It is appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the disclosure or of any exemplified term. Likewise, the disclosure is not limited to various embodiments given in this specification.

It is understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It is understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present disclosure.

It is understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It is also appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It is understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present disclosure belongs. It is further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially" or "approximately" shall generally mean within 20 percent, preferably within 10 percent, and more preferably within 5 percent of a given value or range. Numerical quantities given herein are approximate, meaning that the terms "around," "about," "substantially" or "approximately" can be inferred if not expressly stated.

As used herein, the terms "comprise" or "comprising," "include" or "including," "carry" or "carrying," "has/have" or "having," "contain" or "containing," "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the disclosure.

Embodiments of the disclosure are illustrated in detail hereinafter with reference to accompanying drawings. It should be understood that specific embodiments described herein are merely intended to explain the disclosure, but not intended to limit the disclosure.

Figure 2:
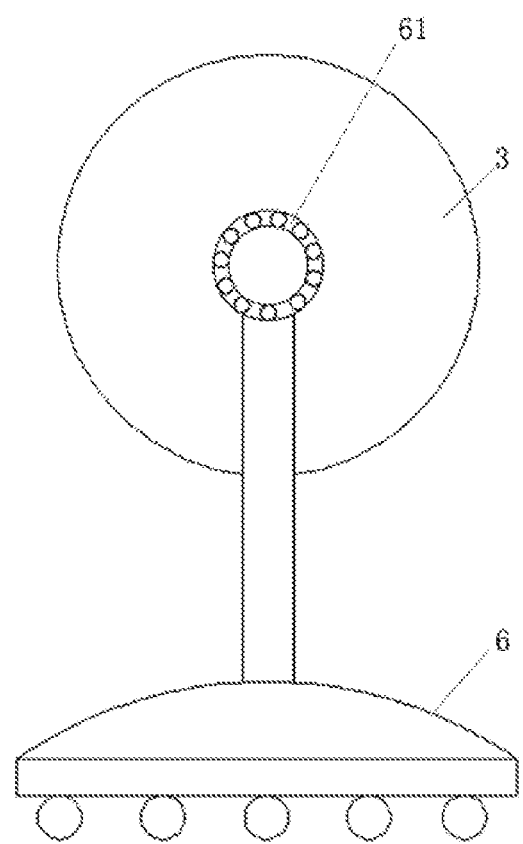
FIG. 2 is a schematic structural view of a translational trolley in the present disclosure.

In order to enable the reviewing committee to have a better understanding for the objects, features and functions of the present disclosure, the preferred embodiments are described in detail below with reference to the drawings:

As shown in FIGS. 1 and 2, a schematic structural view of a preferred embodiment of the present disclosure is provided. The present disclosure provides a lead-acid battery storage container, mainly including an upper compartment body 1 and a lower compartment body 2; the upper compartment body 1 is provided with a pressure roller 3 driven by a driving mechanism located at both sides of the upper compartment body 1; the driving mechanism is a translational trolley 6, and a bearing block 61 engaged with an end of the pressure roller 3 is provided at an upper side of the translational trolley 6; the bearing block 61 is synchronously operated with the translational trolley 6 on both sides to roll the pressure roller 3 parallelly, so that the lead-acid storage battery stored in the upper compartment body 1 is squeezed, which causes that, on the one hand, the waste acid in the lead-acid storage battery flows out, and on the other hand, the batteries are compacted for being cut and crushed later.

A slide rail 11 is provided at one end of the upper compartment body 1, and an air duct 12 is provided at the other end; the slide rail 11 is inclined downwardly and provided with a plurality of wind curtains 10, an exhaust fan 71 is provided in the air duct 12 connected to the water tank 7, with the gas discharged by an exhaust pipe 72; after the lead-acid battery is squeezed or placed for a long time, the acid gas is overflowed; the wind curtains 10 provided in the slide rail 11 forms a closed space of the upper compartment body 1 to discharge the harmful gas through the air duct 12 and through the water tank 7 for filtration treatment; a grab bucket 4 is provided at the top of the upper compartment body 1, and a collecting tank 5 is provided at both sides of the bottom thereof; and the grab bucket 4 is preferably a six-claw grab bucket, mainly for grasping and throwing the compacted lead-acid batteries into the slide rail 11.

The collecting tank 5 extends outside the upper compartment body 1 to be connected to the waste acid collecting bin 8; the collecting tank 5 is provided with a meshed cover and guides the waste acid into the waste acid collecting bin 8; and the meshed cover prevents crushed aggregates of the lead-acid battery from falling out into the collecting tank 5 during the compaction process, and avoids the blockage of the collecting tank 5.

The bottom of the upper compartment body 1 is made of granite to reduce corrosion of the acid liquid to the floor of the upper compartment body 1. If the use time is too long or it is broken artificially, the acid liquid will only enter the water pool 21 of the lower compartment body 2 to avoid polluting the land.

The slide rail 11 is connected to the crushing device 9 of which the bottom is provided with an acid liquid pipe 91 connected to the water pool 21; the water pool 21 is located at the lower compartment body 2 and provided with an overflow port 20 and a water supply port 22, and the overflow port 20 is connected to the waste acid collecting bin 8 via a pipe. The water pool 21 mainly performs a medium-term transition treatment on the acid liquid, and the acid liquid leaked from the crushing device 9 or the acid liquid from the upper compartment body 1 are both diluted in the water pool 21. When a certain amount is satisfied, the acid flows into the waste acid collecting bin 8 from the overflow port 20 for uniform recovery treatment; and at the same time, the water in the water pool 21 is replenished from the water supply port 22 at a proper time, so that, on the one hand, the acid liquid is sufficiently diluted, on the other hand, the service life of the water pool 21 may be extended, and the water pool 21 may be prevented from being corroded for too high concentration of the acid liquid.

The above description is only intended to be a preferred embodiment of the present disclosure, and it is not intended to limit the scope of the present disclosure. Therefore, all equivalent changes in the principles of the present disclosure are included in the scope of the present disclosure.

The foregoing description of the exemplary embodiments of the present disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A lead-acid battery storage container, comprising:
   an upper compartment body;
   a slide rail;
   a grab bucket;
   a water pool;
   an overflow port;
   a water supply port, and
   a lower compartment body,
   wherein the slide rail is provided at one end of the upper compartment body; an air duct is provided at another end of the upper compartment body;
   wherein the grab bucket is provided at a top of the upper compartment body, and a collecting tank is provided at a bottom thereof;
   wherein the water pool is located at a bottom of the lower compartment body; the collecting tank is located on both sides of the bottom of the upper compartment body and extends outside the upper compartment body to be connected to a waste acid collecting bin;
   wherein the overflow port is provided at the water pool and connected to the waste acid collecting bin via a pipe, and
   wherein the water supply port is provided at the water pool.

2. The lead-acid battery storage container according to claim 1, further comprising a bearing block, wherein the upper compartment body is provided with a pressure roller (3) driven by a driving mechanism located at both sides of the upper compartment body (1);
   the driving mechanism is a translational trolley; and
   the bearing block engaged with an end of the pressure roller is provided at an upper side of the translational trolley.

3. The lead-acid battery storage container according to claim 1, further comprising a meshed cover, wherein the meshed cover is provided on the collecting tank (5).

4. The lead-acid battery storage container according to claim 3, wherein the bottom of the upper compartment body is made of granite.

5. The lead-acid battery storage container according to claim 1, wherein the slide rail is inclined downward and a plurality of wind curtains are provided in the slide rail.

6. The lead-acid battery storage container according to claim 1, further comprising an exhaust fan, wherein the exhaust fan is provided in an air duct connected to a water tank, with a gas discharged by an exhaust pipe.

7. The lead-acid battery storage container according to claim 1, wherein a slide is connected to a crushing device, and the crushing device has a bottom and the bottom is provided with an acid liquid pipe connected to the water pool.

8. The lead-acid battery storage container according to claim 2, further comprising a meshed cover, wherein the meshed cover is provided on the collecting tank.

9. The lead-acid battery storage container according to claim 5, wherein a slide is connected to a crushing device, and the crushing device has a bottom and the bottom is provided with an acid liquid pipe connected to the water pool.

\* \* \* \* \*